United States Patent [19]

Ikenaga et al.

[11] 4,274,986
[45] Jun. 23, 1981

[54] POLYACETAL MOLDING COMPOSITION

[75] Inventors: Yukio Ikenaga; Osamu Matsuno, both of Shizuokaken, Japan

[73] Assignee: Celanese Corporation, New York, N.Y.

[21] Appl. No.: 146,967

[22] Filed: May 5, 1980

Related U.S. Application Data

[63] Continuation of Ser. No. 66,252, Aug. 13, 1979, abandoned.

[30] Foreign Application Priority Data

Jun. 26, 1978 [JP] Japan .................................. 53-77810

[51] Int. Cl.$^3$ .............................................. C08L 91/00
[52] U.S. Cl. ................................. 260/22 CQ; 528/230
[58] Field of Search .................... 260/22 CQ; 528/230

[56] References Cited

U.S. PATENT DOCUMENTS

| 3,230,204 | 1/1966 | Chloupek et al. | 260/22 CQ |
| 3,277,044 | 10/1966 | Weissermel et al. | 528/230 |
| 4,051,089 | 9/1977 | Tobias et al. | 260/22 CQ |

Primary Examiner—Lucille M. Phynes
Attorney, Agent, or Firm—John A. Shedden

[57] ABSTRACT

A polyacetal composition having excellent antistatic characteristics, good surface luster and moldability is disclosed. The composition embodying these properties includes a polyacetal resin and incorporated therein, a polyhydric alcohol fatty acid ester including a hydroxyl group and a polyethylene glycol.

2 Claims, No Drawings

POLYACETAL MOLDING COMPOSITION

This is a continuation of application Ser. No. 066,252 filed Aug. 13, 1979, now abandoned.

The present invention relates to a polyacetal resinous composition having excellent anistatic characteristics, good surface luster and moldability.

A polyacetal resin is used broadly for production of functional parts in many industrial fields. For example, the machine electrical industries employ polyacetal resins for their excellent mechanical properties, thermal characteristics and durability. However, polyacetal resins have high surface resistivity, as do many other plastics, and therefore, in some applications, this resin causes trouble owing to electrostatic charging, i.e., generation of electrostatic noises, surface contamination and adhesion of dusts and the like.

Many antistatic agents are marketed as additives to eliminate electrostatic charge buildup. These commercially available antistatic agents are effective for use in polyacetal resins. However, the utilization of ionic substances in polyacetal resins is not desirable because they cause discoloration and reduce thermal stability. For example, when the reaction product of a higher aliphatic amine with ethylene oxide, which has a high charging-preventing effect on polyacetals, is incorporated in a polyacetal resin singly or in combination with a surface active agent such as a fatty acid monoglyceride of a polyhydric alcohol, e.g., glycerin, an especially high charging-preventing effect or antistatic effect is attained, but since the additive is weakly basic, reduction of the thermal stability and discoloration inevitably occur.

Non-ionic antistatic agents have a much lower tendency toward these adverse effects. For example, polyhydric alcohol higher fatty acid esters such as higher fatty acid monoglycerides, higher fatty acid sorbitan esters and higher fatty acid polyethylene glycol esters are neutral substances having an antistatic effect on polyacetal resins. Unfortunately, most of these neutral antistatic agents have reduced charge preventing effects. In order to increase their charge preventing property to a practical level, it is necessary to incorporate them in heavy concentrations. Thus, even neutral antistatic agents having a relatively high antistatic effect must be incorporated in a concentration of at least 0.5%, preferably at least 1%.

It is impractical to incorporate concentrations of the order recited above. These antistatic agents ordinarily possess lubricating properties. Thus, incorporation of heavy concentrations of antistatic agents of this type result in reduced moldability and reduction of the mechanical properties of articles molded from polyacetal resins containing large amounts of these antistatic agents.

A worse situation obtains when solid antistatic agents, such as glycerin monostearate, are employed. Large quantities of waxy bleeds appear on the surface. In case of liquid antistatic agents, large quantities of liquid bleeds are formed, with resultant degradation in the appearance and functioning of molded articles produced therefrom. Moreover, with the exception of some monoglycerides, purification of antistatic agents by distillation are difficult. As a result, when these antistatic agents are incorporated in polyacetal resin in large amounts, discoloration and reduction of the stability results. Thus, in case of conventional antistatic agents, it is difficult to reduce the chaging property of the polyacetal to acceptable low levels without such adverse effects as discoloration, excessive bleeding, reduction of stability, changes of physical properties and moldability degradation.

It has now been found that when the concentration of polyhydric alcohol ester type antistatic agent is reduced and a polyethylene glycol having relatively low antistatic characteristics, is added in its place a synergistic effect is manifested. This synergistic effect is to moderate excessive bleeding, excessive lubrication, discoloration and reduction in stability without substantial reduction of the antistatic effect.

In accordance with the present invention a composition is provided in which a polyhydric alcohol fatty acid ester having a hydroxyl group, which is prepared from a fatty acid and a polyhydric alcohol, and a polyethylene glycol are incorporated into polyacetal resins.

By the term, a polyhydric alcohol fatty acid ester having a hydroxyl group is meant alcohol fatty acid esters having at least one hydroxyl group and at least one ester group, obtained by reaction between natural or synthetic fatty acids such as lauric acid, myristic acid, palmitic acid, stearic acid, arachic acid, behenic acid, oleic acid and hydroxylstearic acid and polyhydric alcohols such as glycerin, pentaerythritol, diglycerin and sorbitol. All of these esters are commercially available antistatic agents. In general, the sole use of monoglycerides of stearic acid, palmitic acid and the like is not preferred because conspicuous solid bleeding results. When these monoglycerides are used in combination with polyethylene glycols according to the present invention, bleeding is effectively controlled without a detrimental effect on the monoglyceride's antistatic property. Monoglycerides are advantageously employed because monoglycerides can be purified by distillation with resultant availability of a highly pure product.

Polyethylene glycols include liquid products having relatively low molecular weight as well as solid products having high molecular weights. They have little antistatic properties and thus none of them can be used singly as antistatic agents. However, when they are used in combination with ester type antistatic agents, as in the present invention, remarkably improved antistatic effects are attained by the synergistic action of the two components. In general, the antistatic effect is reduced with increase of the molecular weight of the polyethylene glycol. Accordingly, it is preferred that the molecular weight be no higher than 20,000, more preferably not higher than 10,000. From the viewpoint of antistatic propensity, the lower limit of molecular weight is not critical. However, since a polyethylene glycol having an excessively low molecular weight is easily vaporized, it is preferred that its molecular weight be at least 400. Use of a polyethylene glycol having a molecular weight of at least 1000 is especially preferred because liquid bleeding is eliminated.

The relative concentration of the two components, the polyethylene glycol and fatty acid ester, in the polyacetal composition influences the composition's antistatic property, surface characteristics, stability, moisture-absorbing property and mechanical properties. Since the required degree of the antistatic property, the allowable range of bleeding and the allowable degree of reduction of physical properties varies depending on the polyacetal composition's intended use, the amounts of these additives is adjusted according to the intended use. In many applications, a sufficient antistatic effect is attained if the fatty acid ester content is at least 0.1% and the total content of the fatty acid ester and polyethylene glycol is at least 1%. However, in some applications, a satisfactory antistatic effect is obtained even if the concentration of these additives are even lower. In case of substances that are likely to cause solid bleeding, such as glycerin monostearate, bleeding can be prevented if the concentration of such substance is reduced below 1%, preferably below 0.5%. The term polyacetal refers to oxymethylene polymers, that have recurring —$CH_2O$— units directly attached to each other. They have been known for many years and may be prepared by the polymerization of anhydrous formaldehyde or by the polymerization of trioxane which is a cyclic trimer of formaldehyde. Oxymethylene polymers vary in thermal stability and in molecular weight, depending on their method of preparation. Oxymethylene homopolymers of exceptionally high molecular weight and relatively good stability have been prepared by the repeated sublimation of trioxane from a temperature of 40° C. to a temperature of −80° C. Exceptionally high molecular weight polyoxymethylene have also been prepared by polymerizing anhydrous formaldehyde in the presence of aliphatic or aromatic pimary amines or in the presence of arsines, stibines or phosphines.

High molecular weight polyoxymethylenes may be prepared in high yields and in rapid reaction rates by the use of catalysts comprising boronfluoride coordinate compounds in which oxygen or sulfur is the donor atom, as described in U.S. Pat. No. 2,986,506 by Hudgin and Berardinelli.

Oxymethylene polymers of improved thermal stability have been prepared by copolymerizing trioxane with from 0.1 to 15 mole percent of a cyclic ether having at least two adjacent carbon atoms. Copolymers of this type are described in U.S. Pat. No. 3,027,352 by Cheves T. Walling, Frank Brown and Kenneth W. Bartz. Such copolymers may be described by having at least one chain containing between about 85 and about 99.9 mole percent oxymethylene (—$OCH_2$—) units interspersed with between about 0.4 and about 15 mole percent of —O—R— units wherein R is a divalent radical containing at least two carbon atoms directly linked to each other and positioned in the chain between the two valences with any substituent in the R radical being inert. The preferred copolymers are those made up of oxymethylene and oxyethylene groups, such as copolymers of trioxane with dioxylane or with ethylene oxide. Various additives, for example, amidines, polyamides, metal soaps, bisphenol-type, ester-type or hindered phenol-type antioxidants, and other stabilizers may be incorporated into these polyacetals. Furthermore, reinforcers, fillers and coloring pigments such as glass, talc, white mica, gold mica and carbon, and polymeric substances such as polyurethanes, EVA, other rubbers and thermoplastic resins, may be incorporated into polyacetals.

The composition of the present invention can be prepared by an ordinary mixer such as an ordinary extruder. A well-dispersed composition prepared by using a mixing apparatus having a high capacity, such as a biaxial extruder, is especially preferred because moldability and antistatic property of polyacetals so prepared are especially enhanced when they are prepared in this manner. The biaxial extruder is advantageously employed for incorporating a low-viscosity substance such as mineral oil or lubricants along with the antistatic agent. The polyethylene glycol and fatty acid ester may be preliminarily molten and mixed, or they may be incorporated into the polyacetal prior to kneading in an extruder or the like or they may be directly fed in the liquid state into an extruder or the like.

The excellent results of the composition of the present invention are described in the Examples which appear below.

In these Examples, all of "parts" and "%" are by weight.

EXAMPLES 1 TO 3 COMPARATIVE EXAMPLES 1 TO 3

Glycerin monostearate and polyethylene glycol #2000 (having a molecular weight of 2000) in amounts indicated in Table 1, were added to 99 parts of an acetal copolymer (Duracon M270-02 maufactured by Polyplastics K.K.) and the mixture was kneaded and extruded by means of a biaxial extruder having a diameter of 28 mm.

A plate was prepared from this extruded composition by injection molding. The plate was allowed to stand for 1 week and the half-value period of the charged voltage was measured by an honest meter (manufactured by Shishido Shokai). Separately, the molded article was heated at 80° C. for 4 days and the surface was examined to determine whether bleeding took place or not. Results of these experiments are shown in Table 1 together with results of examination of the adaptability to the molding operation to the extrusion molding process.

TABLE 1

| | Amount (parts) of Additives | | Experimental Results | | |
|---|---|---|---|---|---|
| | Glycerin mono-stearate | Poly-ethylene glycol #2000 | Half-value period (sec) of charged voltage | Occurrence of bleeding of solids | Moldability |
| Example 1 | 0.75 | 0.25 | 0.8 | not observed | good |
| Example 2 | 0.5 | 0.5 | 1.2 | not observed | good |
| Example 3 | 0.25 | 0.75 | 3 | not observed | good |
| Comparative Example 1 | 0 | 0 | 150 | not observed | good |
| Comparative Example 2 | 1 | 0 | 1 | observed | good |
| Comparative Example 3 | 0 | 1 | 110 | not observed | good |

From the foregoing results, it is readily understood that a synergistic effect, enhancing antistatic activity, is attained by the combined use of glycerin monostearate and polyethylene glycol. More specifically, it is apparent that when a portion of the glycerin monostearate added is replaced with polyethylene glycol, which has low antistatic activity, the antistatic effect of glycerin monostearate is substantially retained. Moreover, significant antistatic properties, not obtainable by adding glycerin stearate alone, without formation of solid bleeds, can be obtained without formation of solid bleeds by replacing a portion of glycerin monostearate with polyethylene glycol.

EXAMPLES 4 to 11

In the same manner as described in Example 1, compositions were prepared by changing the kinds and amounts of the additives, and experiments were conducted in the same manner as described in Example 1 to obtain the results shown in Table 2.

EXAMPLE 12

In the same manner as described in Example 1, a composition was prepared by using an acetal homopolymer (Derlin 900 manufactured by DuPont), and experiments were carried out in the same manner as described in Example 1 to obtain the results shown in Table 2.

con M90-02 with aminosilane-treated white mica as a filler as the starting resin, and experiments were carried out in the same manner as described in Example 1 to obtain the results shown in Table 2.

COMPARATIVE EXAMPLES 4 to 15

In the same manner as described in Example 1, various additives such as fatty acid esters were incorporated in Duracon M270-02, and the resulting compositions were tested in the same manner as described in Example 1 to obtain the results shown in Table 3.

TABLE 2

| Example No. | Additive Kind | Amount (%) | Half-Value Period (sec) of Charged Voltage | Bleeding of Solids | Moldability |
|---|---|---|---|---|---|
| 4 | Glycerin monostearate<br>Polyethylene glycol 6000 | 0.25<br>0.75 | 6 | not observed | good |
| 5 | Glycerin monostearate<br>Polyethylene glycol 20000 | 0.5<br>0.5 | 5 | not observed | good |
| 6 | Glycerin monostearate<br>Polyethylene glycol 600 | 0.25<br>0.75 | 0.5 | not observed | good |
| 7 | Glycerin monostearate<br>Polyethylene glycol 600 | 0.15<br>0.85 | 8 | not observed | good |
| 8 | Glycerin monostearate<br>Polyethylene glycol 600 | 0.75<br>0.25 | 0.4 | very slight | good |
| 9 | Glycerin monopalmitate<br>Polyethylene glycol 4000 | 0.5<br>0.5 | 5 | not observed | good |
| 10 | Glycerin monolaurate<br>Polyethylene glycol 4000 | 0.5<br>2.0 | 15 | not observed | good |
| 11 | Sorbitan monostearate<br>Polyethylene glycol 4000 | 0.5<br>2.0 | 30 | not observed | good |
| 12 | Glycerin monostearate<br>Polyethylene glycol 6000 | 0.75<br>0.25 | 15 | very slight | good |
| 13 | Glycerin monostearate<br>Polyethylene glycol 6000<br>Polyurethane | 0.25<br>0.75<br>20 | 10 | not observed | good |
| 14 | Glycerin monostearate<br>Polyethylene glycol 6000<br>White mica | 0.25<br>0.75<br>20 | 8 | not observed | good |

TABLE 3

| Comparative Example No. | Additive Kind | Amount (%) | Half-Value Period (sec) of Charged Voltage | Bleeding of Solids | Moldability |
|---|---|---|---|---|---|
| 1 | Not added | 0 | 150 | not observed | good |
| 4 | Glycerin monolaurate | 1 | 45 | not observed | good |
| 5 | " | 2 | 10 | not observed | excessive lubricatio |
| 6 | Glycerin mono-oleate | 2 | 15 | not observed | excessive lubricatio |
| 7 | Glycerin monostearate | 1 | 1 | observed | good |
| 8 | Sorbitan monolaurate | 1 | 60 | not observed | good |
| 9 | Sorbitan monostearate | 1 | 75 | observed | good |
| 10 | Polyoxyethylene sorbitan laurate | 1 | 40 | not observed | good |
| 11 | Polyoxyethylene sorbitan mono-oleate | 1 | 45 | not observed | good |
| 12 | Polyoxyethylene glycol monolaurate | 2 | 15 | not observed | excessive lubricatio |
| 13 | Polyoxyethylene nonylphenyl ether | 1 | 35 | not observed | good |
| 14 | Polyethylene glycol 2000 | 1 | 120 | not observed | good |
| 15 | Polyethylene glycol 600 | 1 | 105 | not observed | good |

EXAMPLE 13

In the same manner as described in Example 1, a composition was prepared by using a kneaded mixture of Duracon M270-02 and a polyurethane (Pellethan 2102-804 manufactured by Kasei-Upjohn) as the starting resin, and experiments were carried out in the same manner as described in Example 1 to obtain the results shown in Table 2.

EXAMPLE 14

In the same manner as described in Example 1, a composition was prepared by using a mixture of Dura-

What is claimed is:

1. A polyacetal composition comprising a polyacetal and, incorporated therein, a polyhydric alcohol fatty acid ester including a hydroxy group and a polyethylene glycol.

2. A polyacetal composition, as set forth in claim 1, wherein the polyhydric alcohol fatty acid ester is selected from the group consisting of monoglyceride of stearic acid, palmitic acid, myristic acid and lauric acid and the polyethylene glycol is one having a molecular weight in the range of between about 1,000 and 20,000.

* * * * *